March 17, 1936.  W. G. BIRD  2,034,019

ELECTRICAL FREQUENCY RESPONSIVE DEVICE

Filed July 6, 1934  2 Sheets-Sheet 1

William George Bird.
Inventor, per, C. Nye Fraser
Atty.

Patented Mar. 17, 1936

2,034,019

UNITED STATES PATENT OFFICE 2,034,019

ELECTRICAL FREQUENCY RESPONSIVE DEVICE

William George Bird, Redland, Bristol, England

Application July 6, 1934, Serial No. 734,051
In Great Britain July 8, 1933

16 Claims. (Cl. 172—245)

This invention relates to electrical frequency responsive devices such for example as frequency meters, electrical control means and apparatus in which a mechanical response is produced which is dependent upon applied electrical frequency. It is especially applicable to tachometers of the type in which the speed of rotation of a member such as a shaft or wheel is ascertained by measurements of the frequency of the electrical output from an alternating-current generator mechanically coupled to said member.

The general principle of the invention is similar to that of many existing frequency-responsive devices such as for example, frequency-meters of the well-known "deflectional" type. That is to say, a mechanical response to the frequency of an alternating E. M. F. or current is generated by applying the said E. M. F. or current to a system comprising coils wound on magnetic circuits, the application being in such a manner that at lease two magnetic fluxes are generated having similar physical relations or characteristics with regard to the amplitude of the applied E. M. F. or current but different physical relations or characteristics with regard to the frequency thereof. The magnetic fluxes generated in this way are then applied to a mechanical system comprising moving members so arranged that forces or torques are exerted upon them by the action of the fluxes, said moving members being mechanically coupled together so that the forces or torques upon one member or group of members oppose the forces or torques upon the other member or group of members, and the whole arrangement being such that for any applied value of frequency there is one position of equilibrium at which the total torque or force is zero, which position of equilibrium is sensibly independent of the magnitude of the applied E. M. F. or current. It is an object of the invention to provide improved frequency responsive devices of this kind.

The present invention comprises in an electrical frequency-responsive device, in combination a plurality of magnetic circuits having a magnetizing coil to be connected to the supply, a plurality of mechanically connected movable members arranged to be acted upon respectively by the fields of the said magnetic circuits, one at least of the said members being of magnetic material and means to cause a relative variation of the magnetic fields of the magnetic circuits in accordance with variations of the frequency of the supply comprising a closed electrical circuit or closed circuits coupled magnetically either directly or indirectly with one or more of the magnetic circuits. Thus the means to cause a relative variation of the magnetic fields of the magnetic circuits in accordance with variations of the frequency of the supply may comprise a short-circuited coil wound over one of the magnetic circuits or short-circuited coils wound over the magnetic circuits respectively. Or, on the other hand the closed electrical circuit or circuits may be coupled indirectly with the magnetic circuit or circuits by being wound on the core or cores of a transformer or transformers through which the magnetizing coil or coils is or are connected to the supply. When more than one transformer is employed said transformers may have a common core.

The movable members preferably move into or out of the fields of the magnetic circuits under the action of said fields and are so operatively connected mechanically that as one moves more into the field of its magnetic circuit another moves more out of the field of its magnetic circuit.

Preferably the electrical circuit coupled with a magnetic circuit is short-circuited through a resistance and/or a capacity and an electrical circuit may be coupled with each of the magnetic circuits.

The magnetic circuits may have a common core of magnetic material. The invention may be carried out in a variety of different ways.

Forms of the invention will now be described, by way of example, and with reference to the drawings filed with the specification, wherein:—

Figure 1:
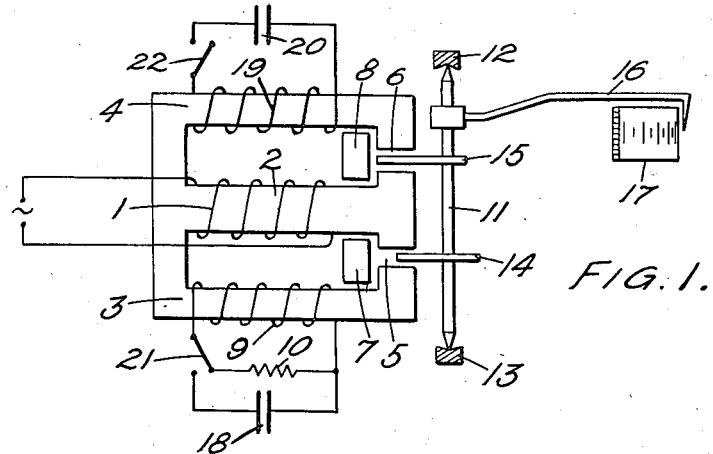
Fig. 1 shows diagrammatically one form of the invention.

Referring to Fig. 1 the magnetizing coil 1 wound upon the ferro-magnetic core 2 is connected to the alternating E. M. F. or current supply either directly or indirectly through a transformer whereby an alternating magnetic flux is generated in said core. The core 2 is continued externally in the form of two ferro-magnetic members 3 and 4 so as to provide two easy magnetic paths for the said flux. These paths comprise air-gaps 5 and 6 respectively, together if necessary with magnetic shunts 7 and 8 across said gaps. A coil 9 is wound on the member 3, and is short-circuited through a small resistance 10 thus forming an arrangement analogous to that of the well-known "shaded-pole" device used in "induction" ammeters and like instruments. If desired the coil 9 may take the form of a band of electrical conducting material, such as copper, upon the member 3 and the resistance 10 may be dispensed with. A spindle 11 mounted in bearings 12 and 13 carries two cam-shaped members 14 and 15 so arranged that they may enter said air-gaps. These members are constructed of magnetic material so that the magnetic fluxes in the air-gaps exert attractions upon them, and by suitable shaping of the members these attractions generate opposing torques on the spindle 11. Alternatively one of the members 14, 15 may be constructed of electrical conducting material such as copper or aluminium in which case the magnetic flux in the respective air-gap exerts a force upon that member due to the well-known "eddy-current repulsion" effect. Such force may be enhanced by suitable electrical "shading" of portions of the ferro-magnetic core 2 and of the member 3 or 4 which is adjacent to the aforesaid air-gap. The other one of the members 14, 15 is constructed, as before, of ferro-magnetic material. In all cases, however, the members are shaped so that these forces cause opposing torques upon the spindle 11. The position of equilibrium of the spindle is indicated by a pointer 16 and by employing a scale 17 it may be caused to give a direct indication of the frequency of the supply or the movement of the spindle may be employed to produce a mechanical response for another purpose such as for the operation of a relay on change of frequency of the supply.

The operative principle of this arrangement of the invention may be explained in a simple manner by the following reasoning, it being understood, however, that the invention is not dependent upon the accuracy or otherwise of this reasoning.

It is apparent that if the coil 9 and resistance 10, or their equivalent, were non-existent then the main magnetic flux generated in the core 2 would divide itself between the two paths provided by the members 3 and 4 and their air-gaps and magnetic shunts in a ratio which would depend only upon the magnetic reluctances of the two paths, and not sensibly upon either the amplitudes or frequency of the main flux. When the coil 9 and resistance 10 or their equivalent are in position, however, there is an E. M. F. generated in the circuit so formed the magnitude of which depends, inter alia, upon both the amplitude and frequency of the main flux, whence it follows that a similar relationship holds also with the currents flowing in this circuit and with the counter-magnetic flux generated thereby in the member 3. Thus the ratio of the fluxes in the two members 3 and 4 now depends not only upon the magnetic reluctances of the two paths but also upon the frequency of the main flux although not upon its amplitude. This is to say, the ratio of the magnetic fluxes across the air-gaps 5 and 6 depends upon the frequency of the applied alternating E. M. F. or current but not upon its amplitude. But the force on any one of the members 14 or 15 is proportional to the square of the R. M. S. value of the flux through the corresponding airgap 5 or 6 and to the rate of change of the virtual reluctance of this air-gap with the angular deflection of the spindle 11, which latter quantity depends upon the shape given to the member. It follows therefore that the position of equilibrium taken up by the moving system depends upon the frequency of the applied E. M. F. or current and upon the shapes given to the members 14 and 15, so that by suitably choosing these shapes any desired type of mechanical response to applied frequency may be obtained. Thus the members may be so designed that the angular displacement of the spindle 11 is substantially proportional to the applied frequency whereby a uniform scale may be obtained when the device is used as a measuring instrument, whilst at the same time the periodic time of the movement for oscillations about a final position of equilibrium may be made the same for all such positions.

It is desirable in practice, although not essential that in any particular position of the moving system the ratio of the fluxes in the members 4 and 3 should be substantially proportional to the applied frequency, as under such conditions the shaping of the members 14 and 15 is simplified and the response of the device is less affected by changes in the wave-form of the applied E. M. F. or current. Such a desirable result may be brought about by making the total ohmic resistance of the circuit comprising the coil 9 and resistance 10, or their equivalent, as low as possible and by choosing suitable values for the magnetic shunts 7 and 8. At the same time, by making the magnetic reluctance of these shunts small the magnetizing current and power required by the device may be reduced, although at the expense of the working torques available for operating the moving system.

The response of the arrangement will still, however, depend to some extent upon the nature of the wave-form of the applied E. M. F. or current, but if such wave-form be sensibly of standard type, that is to say, if the ratios of the amplitudes of its various harmonics are constant and independent of the R. M. S. value and frequency of the E. M. F. or current, then the device can be adjusted to respond correctly on any such waveform at all frequencies by providing for the alteration of values of the resistance 10, the number of turns on the coil 9 or the magnetic shunt 7.

The response of the arrangement is not sensibly affected by magnetic saturation in any one of its ferro-magnetic components provided that the cross-sectional areas of member 4 and magnetic shunt 8 are made at least as great as that of the core 2. The response is affected, however, by changes in the temperature of the device in so far as the value of the total ohmic resistance of the circuit comprising the coil 9 and resistance 10, or their equivalent, is altered thereby. To compensate for the error arising from such alteration, the coil 9 or its equivalent may be of a material having a negligible temperature coefficient. Other suitable electrical impedance may be used with the resistance 10, for example the capacitative reactance represented by the condenser 18 may be employed. If the condenser 18 is used, however, the resistance 10 need not be used. A coil 19 may also be wound on the member 4 and connected in series virtually or actually with an electrical impedance so as to form a closed electrical circuit. Preferably the electrical impedance is a condenser 20. Preferably also, in such an arrangement the coils 9 and 19 are both connected in series with the condensers 18 and 20 respectively so that the two circuits have resonant frequencies which are different. Thus in one the resonant frequency may be at or below the lowest value of frequency to which the device is to respond, and in the other the resonant frequency may be at or above the highest frequency. The result is that the magnetic flux in one of the members 3 or 4 tends to increase continuously with increase of applied frequency whilst the magnetic flux in the other decreases, so that by suitable shaping of the members 14 and 15 a mechanical response may be obtained as before. This arrangement is very effective when the zone of frequencies to which the device is to respond is a narrow one and when it is desirable that the response shall not be sensibly affected by transient fluctuations in the wave-form of the applied E. M. F. or current. Such is often the case, for example, in the application of the device as a frequency-meter in electric power stations.

Any one of the above-mentioned combinations of impedances and coils associated with the members 3 and 4 produces the desired differences in the magnetic fluxes traversing these members and may be employed as most convenient. Furthermore two or more of such combinations may be used in the same device and any one brought into action when required by means of suitable switch means such as represented in Fig. 1 by the switches 21 and 22. Thus the device may in this manner be constructed to respond to applied frequency over a number of different zones or ranges of such frequency and in a variety of different manners. For example, in the application of the device as a tachometer or speedometer the instrument may be designed to operate over any one of several different ranges of rotational speed by manipulation of a suitable switch or switches, the scale being calibrated accordingly.

In another way of carrying out the invention any one of the arrangements already described may be modified by substituting for the coil 1 two separate coils, one of which is wound on the member 3 and the other on the member 4 said coils being then connected in series and energized either directly or indirectly by the applied E. M. F. or current. Furthermore, the two magnetic circuits need not under such circumstances have part of their magnetic paths common.

Figure 2:
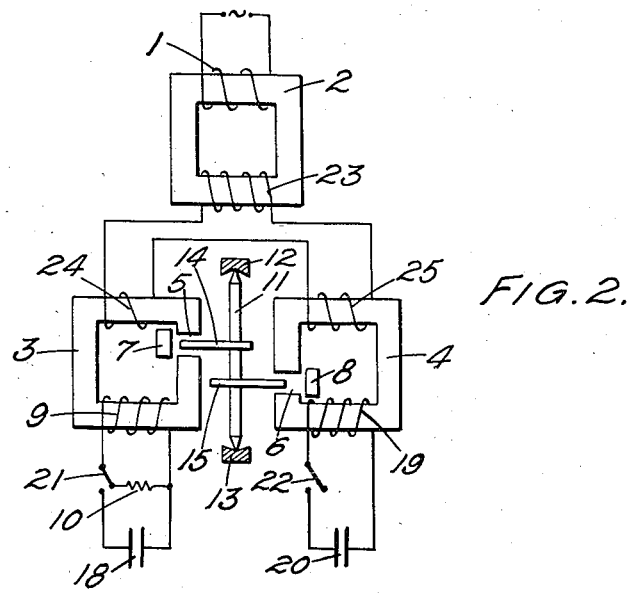
Fig. 2 shows also diagrammatically another form of the invention.
Figure 4:
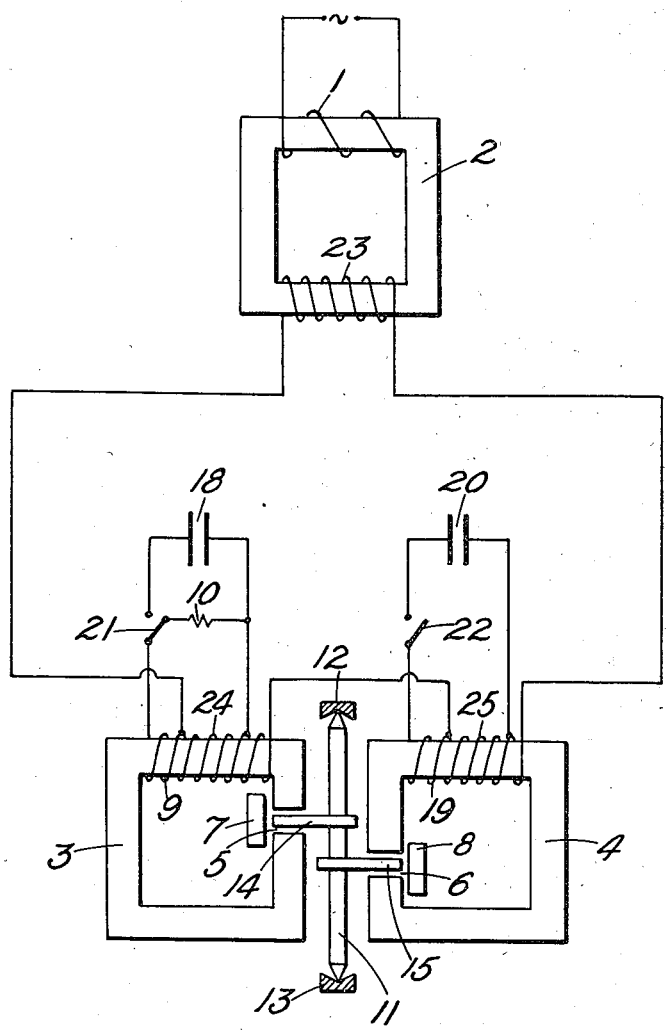
Fig. 4 shows diagrammatically a further form of the invention.

One such arrangement is represented in Fig. 2. In the arrangement shown in this figure, the alternating E. M. F. or current is applied to the primary coil 1 of a transformer 2 and the E. M. F. induced in the secondary coil 23 (which latter may or may not be associated with the primary coil 1 in an arrangement analogous to that of an auto-transformer) is applied to the two coils 24 and 25 connected in series and wound on separate ferro-magnetic cores 3 and 4. The other components of the apparatus are similar to those of Fig. 1 and the references correspond. The operation is also similar to that of Fig. 1. In the present case, however, any one or both of the coils 9 and 19 need not necessarily be separate from the coils 24 and 25 respectively but may be associated therewith in an arrangement virtually equivalent to that of an auto-transformer as shown in Fig. 4. In a particular case the transformation ratio in the auto-transformer may be 1 to 1. In any such arrangement comprising separate coils 24 and 25 on the two magnetic circuits the transformer 2 may under some circumstances be omitted, the E. M. F. being then applied directly to the said coils in series. Such a procedure is not desirable, however, if there be any possibility of the E. M. F. or current becoming sufficiently large to cause magnetic saturation in any one or both of the members 3 and 4 as under such circumstances the response of the device becomes no longer independent of the amplitude of the E. M. F. or current.

In any of the arrangements of the invention, means well known in the art may also be provided to constrain the moving system in a "zero" or neutral position when the device is not in action.

Figure 3:
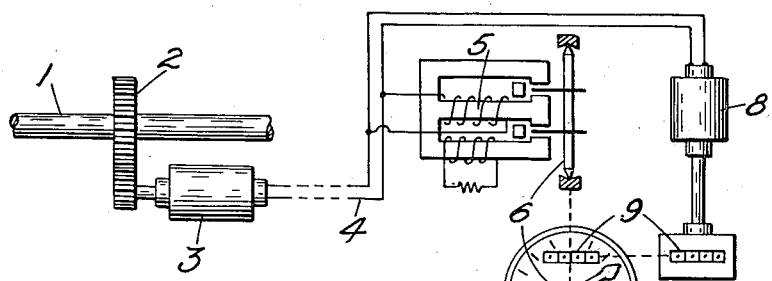
Fig. 3 shows diagrammatically a tachometer embodying the features of the invention.

As stated above, the invention is of general application in all cases where a mechanical response dependent upon applied frequency is required and Fig. 3 represents one of the arrangements of the invention applied as a speedometer or tachometer. In this arrangement the shaft 1 whose speed of rotation is to be determined is mechanically coupled by gearing 2 or equivalent means to an alternating-current generator 3 so that the frequency of the output from this generator is proportional to the speed of the shaft. The said output is then conducted by leads 4 to a frequency-responsive device 5 constructed in accordance with the invention, the arrangement and manner of response of this device being such as to cause movement of a pointer 6 over a dial 7 which may be calibrated in terms of the rotational speed of the shaft or any quantity dependent thereon. Said scale may comprise a number of alternative scales corresponding to different ranges of rotational speed, any one of which may be made applicable by manipulation of a switch or switches in the manner previously described.

The output may also if desired be applied to an alternating current synchronous motor 8 which is mechanically coupled to a revolution counter 9 the scale readings of which also appear on the dial 7, and by virtue of the synchronism existing between the generator 3 and motor 8 the scale readings may be such as to indicate the total number of revolutions made by the shaft 1 in a given time or any quantity dependent thereon.

It will be understood that more than two magnetic circuits may be employed with a member movable into and out of the field of each magnetic circuit.

By suitable choice of the number of magnetic circuits magnetically coupled with closed electrical circuits and of the nature of the impedances and numbers of turns on the coils associated with the said closed electrical circuits, it is possible to create a difference in the frequency-characteristics of the fluxes in the various magnetic circuits which difference may be made to take practically any required form.

Instead of shaping the movable members 14, 15, to give a desired movement, the poles of the magnetic cores on the gaps may be shaped, as well known in the art, to produce a similar result.

What I claim is:—

1. In a device responsive to the frequency of an electrical supply, in combination a plurality of magnetic circuits having a magnetizing coil to be connected to the supply, a plurality of mechanically connected movable members arranged to be acted upon by the fields of the said magnetic circuits, one at least of the said members being of magnetic material, and a closed electrical circuit coupled magnetically with one of the magnetic circuits and adapted for causing relative variation of the fields of the magnetic circuits in accordance with variation of the frequency of the supply.

2. In a device responsive to the frequency of an electrical supply, in combination a plurality of magnetic circuits having a magnetizing coil to be connected to the supply, a plurality of mechanically connected movable members arranged to be acted upon respectively by the fields of the said magnetic circuits, one at least of the said members being of magnetic material, and a short-circuited coil wound over one of the magnetic circuits.

3. In a device responsive to the frequency of an electrical supply, in combination a plurality of magnetic circuits having a magnetizing coil, a transformer which has the said coil connected to it and is adapted for being connected to the supply, a plurality of mechanically connected movable members arranged to be acted upon respectively by the fields of the said magnetic circuits, one at least of the said members being of magnetic material, and a short-circuited coil magnetically coupled with one of the magnetic circuits and adapted for causing relative variation of the fields of the magnetic circuits in accordance with variation of the frequency of the supply.

4. Frequency-responsive device comprising a plurality of magnetic circuits, exciting means for the said circuits, a plurality of mechanically connected movable members of which one at least is of magnetic material and each is so located in relation to a respective magnetic circuit as to be movable into and out of the field thereof under the influence of the said field, the mechanical connection between the said members being such that as one moves into the field of its respective magnetic circuit another moves out from the field of its respective magnetic circuit, and a closed electrical circuit coupled magnetically with one of the magnetic circuits.

5. Frequeny-respective device comprising a plurality of magnetic circuits, exciting means for the said circuits, magnetic cores for the said circuits and having gaps therein, a plurality of mechanically connected movable members of which one at least is of magnetic material and each is so located in relation to a gap in a respective magnetic core as to be movable into and out of the said gap under the influence of the magnetic field, the said members being connected so that one member moves into a gap as another moves out from a gap, and a closed electrical circuit coupled magnetically with one of the magnetic circuits.

6. Frequency-responsive device comprising a plurality of magnetic circuits, exciting means for the said circuits, a plurality of mechanically connected movable members of which one at least is of magnetic material and each is arranged to be acted upon by the field of a respective magnetic circuit, an electrical circuit coupled magnetically with one of the magnetic circuits, and a resistance through which the said circuit is closed upon itself.

7. Frequency-responsive device comprising a plurality of magnetic circuits, exciting means for the said circuits, a plurality of mechanically connected movable members of which one at least is of magnetic material and each is arranged to be acted upon by the field of a respective magnetic circuit, an electrical circuit coupled magnetically with one of the magnetic circuits, and a capacity through which the said circuit is closed upon itself.

8. Frequency-responsive device comprising a plurality of magnetic circuits with magnetic cores, exciting means for the said circuits, a plurality of mechanically connected movable members of which one at least is of magnetic material and each is arranged to be acted upon by the field of a respective magnetic circuit and a band of electrically conducting material mounted upon one of the magnetic cores and connected upon itself to form a closed electrical circuit.

9. Frequency-responsive device comprising a plurality of magnetic circuits, exciting means for the said circuits, a plurality of mechanically connected movable members of which one at least is of magnetic material and each is so located in relation to a respective magnetic circuit as to be movable into and out of the field thereof under the influence of the said field, and closed electrical circuits coupled magnetically and respectively with each of the magnetic circuits and adapted for causing relative variation of the fields of the magnetic circuits in accordance with variation of frequency of the excitation.

10. Frequency-responsive device comprising a plurality of magnetic circuits, exciting means for the said circuits, a plurality of mechanically connected movable members each of which is so located in relation to a respective magnetic circuit as to be movable into and out of the field thereof under the influence of the said field, and closed electrical circuits coupled magnetically and respectively with each of the magnetic circuits and adapted for causing relative variation of the fields of the magnetic circuits in accordance with variation of frequency of the excitation, the said electrical circuits being designed to have resonant frequencies below and above the lowest and highest values respectively of the frequency to which the apparatus shall respond.

11. Frequency-responsive device comprising a plurality of magnetic circuits, exciting means for the said circuits, a plurality of mechanically connected movable members each of which is arranged to be acted upon by the field of a respective magnetic circuit, an electrical circuit coupled magnetically with one of the magnetic circuits, an ohmic resistance, a capacity, and switch means by which the electrical circuit can be closed upon itself through either the resistance or the capacity.

12. Frequency-responsive device comprising a plurality of magnetic circuits, exciting means for the said circuits, magnetic cores for the said circuits and having gaps therein, a plurality of mechanically connected movable members each of which is so located in relation to a gap in a respective magnetic core as to be movable into and out of the said gap under the influence of the magnetic field, the said members being connected so that one member moves into a gap as another moves out from a gap, a magnetic shunt for at least one of the said gaps, and a closed electrical circuit coupled magnetically with one of the magnetic circuits.

13. Frequency-responsive device comprising a plurality of magnetic circuits, exciting means for the said circuits, a common magnetic core-body for the said circuits, a plurality of mechanically connected movable members arranged to be acted upon respectively by the fields of the said magnetic circuits, one at least of the said members being of magnetic material, and a closed electrical circuit coupled magnetically with one of the magnetic circuits and adapted for causing relative variation of the fields of the magnetic circuits in accordance with variation of the frequency of the supply.

14. In a device responsive to the frequency of an electrical supply, in combination a plurality of magnetic circuits each having a magnetizing coil to be connected to the supply, a plurality of mechanically connected movable members arranged to be acted upon respectively by the fields of the said magnetic circuits, and a closed electrical circuit coupled magnetically with one of the magnetic circuits by being connected in auto-transformer fashion with the magnetizing coil of that magnetic circuit.

15. In a device responsive to the frequency of an electrical supply, in combination a plurality of magnetic circuits each having a magnetizing coil to be connected to the supply, a plurality of mechanically connected movable members arranged to be acted upon respectively by the fields of the said magnetic circuits, and closed electrical circuits coupled magnetically with respective magnetic circuits by being connected in auto-transformer fashion with the magnetizing coils of the magnetic circuits.

16. In a device responsive to the frequency of an electrical supply, in combination a plurality of magnetic circuits having a magnetizing coil to be connected to the supply, a plurality of mechanically connected movable members of magnetic material arranged to be acted upon by the fields of the said magnetic circuits, and a closed electrical circuit coupled magnetically with one of the magnetic circuits and adapted for causing relative variation of the fields of the magnetic circuits in accordance with variation of the frequency of the supply.

WILLIAM GEORGE BIRD.